US010969048B2

(12) United States Patent
Stahl et al.

(10) Patent No.: US 10,969,048 B2
(45) Date of Patent: Apr. 6, 2021

(54) ELECTRICALLY HEATED TUBING BUNDLE

(71) Applicant: Dekoron Unitherm LLC, Cape Coral, FL (US)

(72) Inventors: James E. Stahl, Cape Coral, FL (US); Paul J. Brezovsky, Naples, FL (US)

(73) Assignee: Dekoron Unitherm LLC, Cape Coral, FL (US)

( * ) Notice: Subject to any disclaimer, the term of this patent is extended or adjusted under 35 U.S.C. 154(b) by 119 days.

(21) Appl. No.: 16/389,344

(22) Filed: Apr. 19, 2019

(65) Prior Publication Data

US 2019/0323643 A1  Oct. 24, 2019

Related U.S. Application Data

(60) Provisional application No. 62/660,574, filed on Apr. 20, 2018.

(51) Int. Cl.
  *F16L 53/38* (2018.01)
  *H05B 3/00* (2006.01)

(52) U.S. Cl.
  CPC ............ *F16L 53/38* (2018.01); *H05B 3/0019* (2013.01)

(58) Field of Classification Search
  CPC ................................. F16L 53/38; H05B 3/0019
  USPC .......................................................... 138/33
  See application file for complete search history.

(56) References Cited

U.S. PATENT DOCUMENTS

| 3,351,738 | A  | * | 11/1967 | Kahn ...................... H05B 3/00 392/468 |
| 7,773,867 | B2 | * | 8/2010 | Bourget .............. B05C 11/1042 392/468 |
| 10,123,378 | B2 | * | 11/2018 | Borgmeier .............. F16L 53/38 |
| 10,350,716 | B2 | * | 7/2019 | Tkaczyk .................. H05B 3/06 |
| 10,704,727 | B2 | * | 7/2020 | Pionetti ................ H05B 1/0244 |
| 10,774,969 | B2 | * | 9/2020 | Eder .................... H05B 3/0004 |
| 2011/0073585 | A1 | * | 3/2011 | Sinault .................... F16L 25/01 219/541 |
| 2014/0053935 | A1 | * | 2/2014 | Bunch, Jr. ............... F16L 53/38 138/33 |
| 2014/0238523 | A1 | * | 8/2014 | Wortmann .............. F16L 53/37 138/33 |

(Continued)

*Primary Examiner* — Craig M Schneider
*Assistant Examiner* — David R Deal
(74) *Attorney, Agent, or Firm* — Levenfeld Pearlstein, LLC (57) ABSTRACT

An electrically heated tubing bundle includes one or more tubes configured to allow a fluid to flow therethough, and an electrical resistance heater. The electrical resistance heater includes a plurality of heater wires each having a predetermined electrical resistance, the heater wires extending along at least a portion of the one or more tubes, one or more power wires connected to a power supply, and a connection system having a plurality of input and power leads at a power side of the connection system and a plurality of output and return leads at a probe side of the connection system. The one or more power wires are connected to respective power and input leads. Each heater wire is configured for selective electrical connection to an input and power lead and an output and return lead which form lead pairs for each heater wire, such that a plurality of different circuit configurations for the electrical resistance heater are provided based on electrical connections between the heater wires and the lead pairs.

9 Claims, 5 Drawing Sheets

(56) References Cited

U.S. PATENT DOCUMENTS

| | | | |
|---|---|---|---|
| 2014/0366974 A1* | 12/2014 | Etscheid | F01N 3/2066 |
| | | | 138/33 |
| 2015/0122362 A1* | 5/2015 | Haugan | H02M 5/4585 |
| | | | 138/33 |
| 2015/0144217 A1* | 5/2015 | Reusche | F16L 53/38 |
| | | | 138/33 |
| 2019/0128461 A1* | 5/2019 | Pionetti | F17D 1/18 |

* cited by examiner

FIG. 12

ELECTRICALLY HEATED TUBING BUNDLE

BACKGROUND

The present disclosure relates generally to a tubing bundle, and in particular, an electrically heated tubing bundle.

A tubing bundle includes one or more tubes through which fluid may be transported. The tubing bundle may be heated to keep the fluid at a constant temperature from an inlet of the tubing bundle to an outlet.

A number of different electric heating methods are currently used to heat the tubing bundle, including self-regulating, power limiting, and constant power density parallel heating tapes. The self-regulating, power limiting and constant power density heating tapes above may all be cut to discrete lengths, and thus, may be supplied in a number of different lengths.

However, each of these heaters has limitations. For example, self-regulating and power limiting heaters have difficulty attaining higher temperatures needed in some applications, unless the tubing bundle is constructed with heavy layers of insulation. Because heat output reduces as a surface temperature increases, a larger heater is required so that a heat output required at the desired fluid operating temperature is available. This may lead to issues with total current draw and a maximum bundle length.

In addition, the heaters must be cabled around or placed beside the bundled tubing. Accordingly, the heaters are in contact with only a portion of the bundled tubing. Additional steps or resources are required in order to provide uniform heat transfer to other tubes or portions of a single tube in the bundle.

A constant power density heater (also referred to as a constant wattage heater) may avoid reduction in heat output as the temperature increases. Thus, less thermal insulation may be used, and a longer overall length may be provided than in the other parallel heating tapes above. However, the constant power density heater also experiences the drawbacks discussed above relating to contact with the tube or tubes and the subsequent challenges to provide uniform heat transfer. The constant power density heater is also susceptible to loss of heating zones. Thus, the constant power density heater encounters problems with short service life and may require frequent and/or costly replacement.

Another electric heater used in bundled tubing applications is a series resistance heater. A known series resistance heater includes single or multiple strands of alloy heater wire encapsulated in high temperature electrical insulation, such as silicone or a fluoropolymer. The heater wire is wrapped around the tube or tubes of the tubing bundle to create a uniform heat envelope and supply constant heat output. Accordingly, a less powerful heater may be used, similar to the constant power density heater above.

However, in a known series resistance heater, the size and alloy of the heater wire (also referred to as resistance wire) must be selected to meet the length, power (heat) output and voltage required for the tubing bundle design. That is, the size and alloy of the heater wire is selected on a case-by-case basis during manufacture, depending on the design requirements for power output, voltage and length of the bundled tubing product. While manufacturers may be able to sufficiently stock a variety of wire alloys to meet these requirements, it has been found that current methods of construction limit the length of a finished tubing bundle to about 200 feet.

Figure 1:
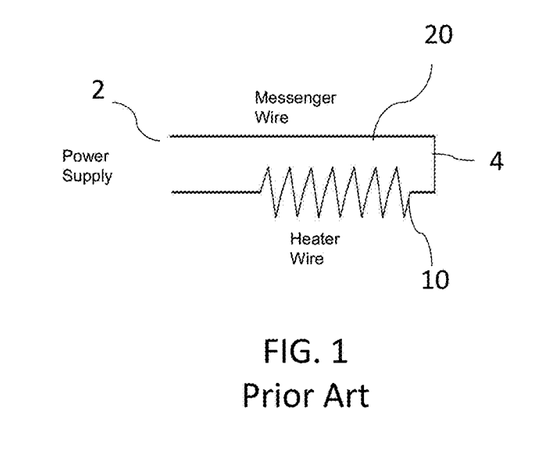
FIG. 1 is a schematic diagram of wires in a known electric resistance heater used in tubing bundles.

FIGS. 1-4 are schematic diagrams showing schematic circuit diagrams of different known series resistance heaters for use in tubing bundle applications. Referring to FIG. 1, a single heater wire 10 is connected at an end of the tubing bundle nearest to the power supply (power end, shown generally at 2). A single messenger wire 20 is routed to the opposite end (probe end, shown generally at 4) of the tubing bundle and connected to the other end of the heater wire 10, to create a single wire circuit.

Figure 2:
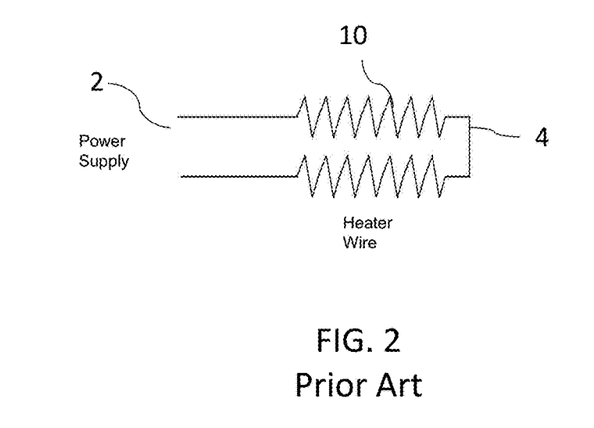
FIG. 2 is a schematic diagram of wires in another known electric resistance heater used in tubing bundles.

Referring to FIG. 2, another known series resistance heater includes two heater wires 10 connected at the probe end 4 and powered by a power supply connected to the wires at the power end 2 of the tubing bundle. Multiple wires may be connected in a similar manner.

Figure 3:
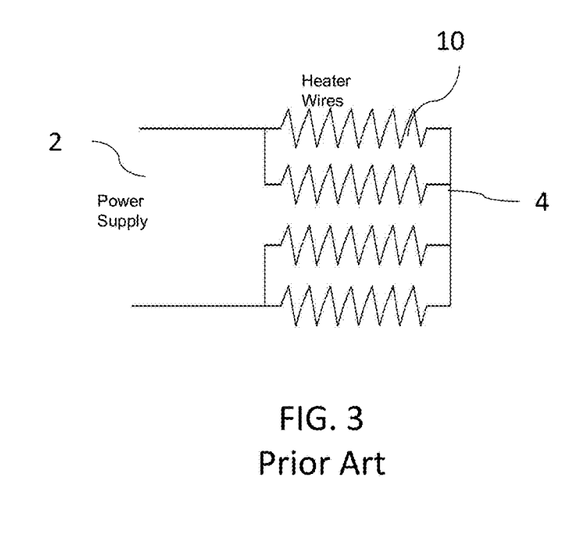
FIG. 3 is a schematic diagram of wires in another known electric resistance heater used in tubing bundles.

Referring to FIG. 3, another known series resistance heater uses four heater wires 10 instead of two, with connections similar to those described above. For example, the heater wires 10 may be connected at the probe end 4.

Figure 4:
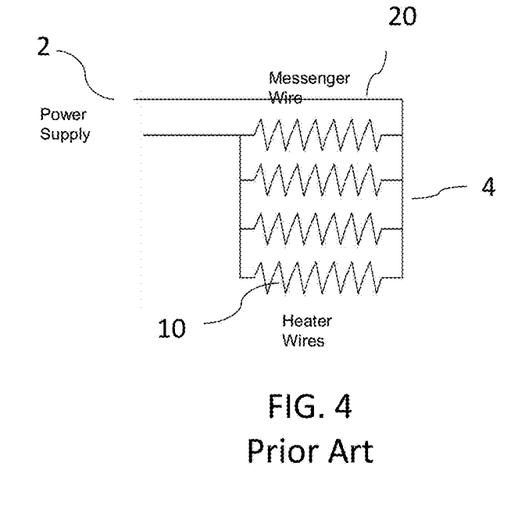
FIG. 4 is a schematic diagram of wires in another known electric resistance heater used in tubing bundles.

Referring to FIG. 4, another known series resistance heater may use four heater wires 10 running in parallel with a single messenger wire 20 to complete the circuit.

An alternative to the heaters above, by MASTERFLEX AG, is a pre-insulated electric traced heated hose. The electric traced heated hose uses a series resistance wire heater similar to those described above. The heater is installed using a textile braider to braid the heating wire around the tubing core. The heater wire is held in place due to the braiding. Textile braiding is a continuous operation which may allow the bundle length may exceed 200 feet. However, the heating wire must still be selected based on overall length, power output and voltage of the bundle.

The known tubing bundles having electric heaters described above are typically suitable for applications where the heating wire size and alloy are selected for a tubing bundle product having a fixed length. However, tubing bundles are frequently ordered having a length 15-20% longer than necessary to allow for changes in the route used when installing the tubing bundle. Because selection of the size and alloy for the heating wire is based in part on a length of the tubing bundle, a change in length of the tubing bundle during or after installation in the field may adversely affect the intended performance of the series resistance heater. For example, when the length of the tubing bundle is decreased, e.g., when the bundle is trimmed or cut to size in the field, the power or heat output of the heater increases. In some tubing bundles, trimming only about 10% of the length may make control of the heater difficult and the heater may cause a temperature to rise outside a desired range.

Accordingly, it is desirable to provide a tubing bundle with the robustness and capabilities of series resistance heating wire in a product that can be trimmed to length in the field without substantial loss of control.

SUMMARY

According to one embodiment, an electrically heated tubing bundle includes one or more tubes configured to allow a fluid to flow therethough, and an electrical resistance heater. The electrical resistance heater includes a plurality of heater wires each having a predetermined electrical resistance, the heater wires extending along at least a portion of the one or more tubes, one or more power wires connected to a power supply, and a connection system having a plurality of input and power leads at a power side and a plurality of output and return leads at a probe side of the connection system. The one or more power wires are connected to respective power and input leads. Each heater wire is configured for selective electrical connection to an input and power lead and an output and return lead which form lead pairs for each heater wire, such that a plurality of different circuit configurations for the electrical resistance heater are provided based on electrical connections between the heater wires and the lead pairs.

One or more heater wires of the plurality of heater wires may have an electrical resistance different than the electrical resistance of another heater wire of the plurality of heater wires. In one embodiment, each heater wire of the plurality of heater wires has a different electrical resistance. In one embodiment, each heater wire of the plurality of heater wires has the same electrical resistance.

In one embodiment, the electrically heated tubing bundle may further include one or more selectively removable power end bridges disposed between and electrically connecting two input and power leads, and one or more selectively removable probe end bridges disposed between and electrically connecting two output and return leads. The plurality of circuit configurations for the electrical resistance heater may further include circuit configurations based on electrical connections formed by the power end bridges and the probe end bridges.

In one embodiment, the circuit configurations of the plurality of circuit configurations may have different electrical resistances. In one embodiment, a circuit configuration for the electrical resistance heater is selected at the connection system based on a length of the tubing bundle, a supply voltage, or desired temperature.

A length of the tubing bundle may include a first length in an initial condition and a second length in a trimmed condition, less than the first length. When the tubing bundle is in the initial condition, the electric resistance heater may have a first circuit configuration, and when the tubing bundle is in the trimmed condition, the electric resistance heater may have a second circuit configuration, different from the first circuit configuration.

The connection system may be disposed at a probe end of the tubing bundle.

These and other features and advantages of the present invention will be apparent from the following detailed description, in conjunction with the appended claims.

DETAILED DESCRIPTION

While the present device is susceptible of embodiment in various forms, there is shown in the figures and will hereinafter be described a presently preferred embodiment with the understanding that the present disclosure is to be considered an exemplification of the device and is not intended to be limited to the specific embodiment illustrated.

Figure 5:
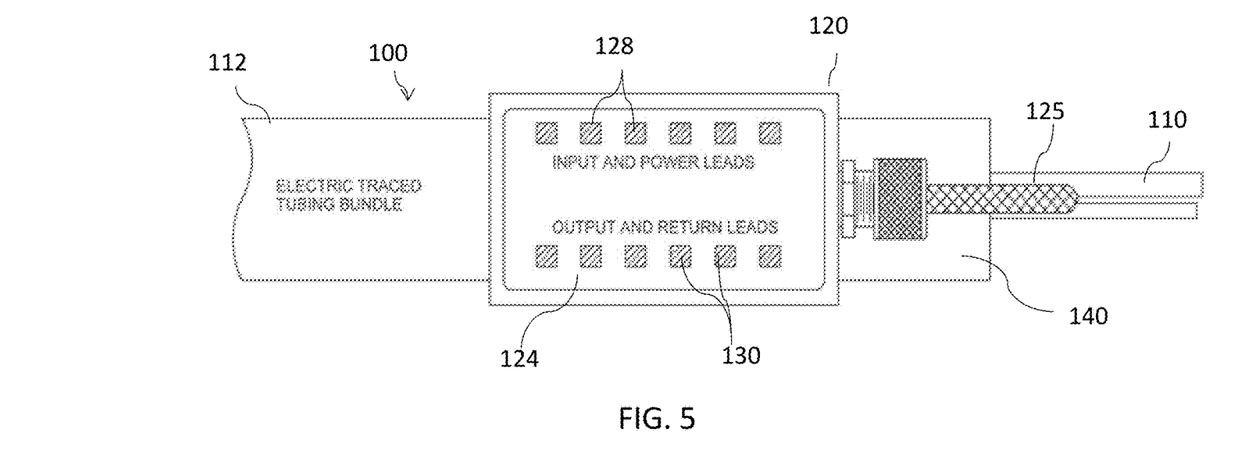
FIG. 5 is a top view of a portion of a tubing bundle according an embodiment.
Figure 6:
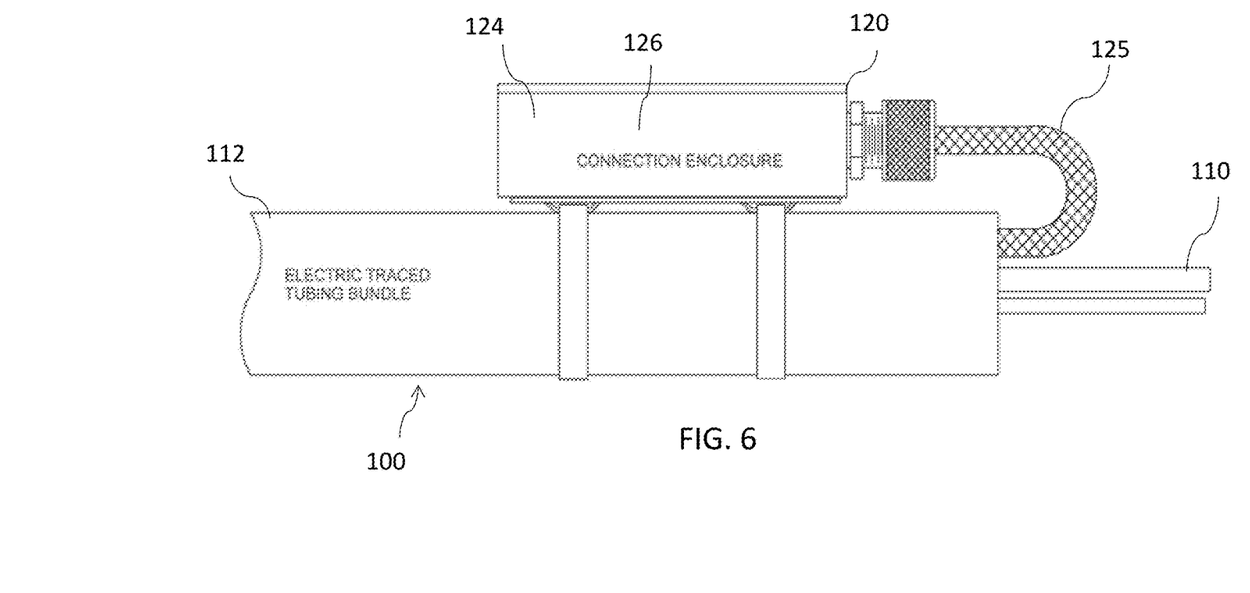
FIG. 6 is a side view of the tubing bundle of FIG. 5.

FIG. 5 is a top view showing a portion of an electrically traced (or heated) tubing bundle 100 according to an embodiment. FIG. 6 is a side view of the tubing bundle 100 of FIG. 5. Referring to FIGS. 5 and 6, the tubing bundle 100 generally includes one or more tubes 110 configured to allow for a fluid, including a liquid, gas or vapor, to flow from an inlet end to an outlet end. The one or more tubes 110 may be formed of known suitable materials, such as a metal, plastic or composite material.

The tubing bundle 100 also includes an electric resistance heater 120 configured to output heat to maintain the fluid in the tube or tubes 110 at a desired temperature or within a desired temperature range. The tubing bundle 100 may optionally include a jacket 112, in which at least a portion of the tubes 110 or disposed, as well as a portion of the electric resistance heater 120.

In one embodiment, the electric resistance heater 120 includes a plurality of heater wires 122 (see FIGS. 7-12) and a connection system 124. The plurality of heater wires 122 extend along at least a portion of the length of the tube or tubes 110 in a predetermined pattern to allow for suitable thermal transfer from the wires 122 to the tube(s) 110. The connection system 124 is connected to the plurality of heater wires 122 and is configured to allow selection of heater wires 122 to which a voltage may be supplied. In one embodiment, a flexible electrical conduit 125, commonly referred to as a "pig-tail," may house the heater wires 122 and extend between the connection system 124 and portion of the tube(s) 110 along which the heater wires 122 extend. It is understood, however, that the flexible electrical conduit 125 may be omitted in some embodiments here. The connection system 124 is configured to be operated so that a suitable circuit configuration of the heater 120 can be selected from a plurality of possible circuit configurations when the tubing bundle 100 is installed, as described further below.

Individual heater wires of the plurality of heater wires 122 may be selected during manufacture based on an intended application of the tubing bundle 100 and/or desired heating parameters or application-specific heating requirements or preferences for the tubing bundle 100. For example, the heater wires of the plurality of heater wires 122 may be selected based on a desired supply voltage to be provided to the tubing bundle 100, a desired power or heat output of the heater 120 (and in turn, a desired fluid temperature of the fluid within the one more tubes 110), and/or a length of the tubing bundle 100.

To this end, heater wires of the plurality of heater wires 122 may be selected based on an electrical resistance of the heater wire. In one embodiment, one or more heater wire of the plurality of heater wires 122 may have the same electrical resistance as another. In one embodiment, all heater wires of the plurality of heater wires 122 may have the same electrical resistance as one another. In one embodiment, each heater wire of the plurality of heater wires 122 may have a different electrical resistance than each of the other heater wires of the plurality of heater wires 122.

For example, in one embodiment, a heater wire of the plurality of heater wires 122 may have a first electrical resistance and another heater wire of the plurality of heater wires 122 may have a second electrical resistance different than the first electrical resistance. In another embodiment, first and second electrical resistances may be the same. It will be appreciated that the plurality of heater wires 122 may include additional heater wires each having an electrical resistance which may be same or different from each of the other heater wires.

Electrical resistance of the heater wires may be based on physical characteristics of the heater wire, for example, a material from which the heater wire is made and/or a size, or gauge, of the heater wire. Accordingly, in one embodiment, some or all of the heater wires of the plurality of heater wires 122 may have the same physical characteristics as each other. Conversely, in one embodiment, some or all of the heater wires of the plurality of heater wires 122 may have different physical characteristics from each other.

For example, in one embodiment, at least one first heater wire of the plurality of heater wires 122 may have a first size and at least one other heater wire of the plurality of heater wires 122 may have a second size different than the first size. In one embodiment, at least one heater wire of the plurality of heater wires 122 may be made of a first material and at least one other heater wire of the plurality of heater wires 122 may be made of a second material different than the first material. In other embodiments, the first and second sizes and/or materials may be the same. It will be appreciated that the plurality of heater wires 122 may include additional heater wires each having a size or being made from a material that is the same or different from the each of the other heater wires of the plurality of heater wires 122.

In one embodiment, the heating wires 122 may extend around, along or be otherwise positioned relative to the tubes 110 to substantially envelope the tube or tubes 110 to allow for sufficient heat transfer. For example, in one embodiment, the plurality of heater wires 122 may be braided around one or more of the tubes 110. Other configurations, such as a spiral configuration, for positioning the resistance heating wires 122 relative to the tube or tubes 110, so that adequate heat is transferred to the tubes 110 and the fluid therein, will be appreciated by those having ordinary skill in the art.

Referring still to FIGS. 5 and 6, the connection system 124 includes a box 126, a plurality of input and power leads 128 and a plurality of output and return leads 130 connected to the box 126. The box 126 may be releasably, slidably or otherwise movably connected to the tubing bundle 100, for example by way straps, clamps or other suitable fasteners. In one embodiment, an input and power lead 128 is configured for selective operation into and out of electrical connection with one end of a heater wire. Similarly, an output and return lead 130 is configured for selective operation into and out of electrical connection with another end of the same heater wire. Thus, in one embodiment, the heater wire is configured for selective electrical connection to an input and power lead 128 and an output and return lead 130. The leads configured for electrical connection with a same heater wire may also be referred to herein as a lead pair 128, 130. In one embodiment, each of the heater wires is configured for selective electrical engagement with a respective lead pair 128, 130.

The lead pairs 128, 130 may be electrically connected to one another at the box 126. Accordingly, when the lead pairs 128, 130 for a particular heater wire are electrically connected the heater wire, an electrical circuit may be formed. Thus, voltage may be supplied to the heater wire so that the heater wire may output heat, according to the electrical resistance of the wire.

According to an embodiment, the connection system 124 may be disposed at or near a probe end 140 of the electrically heated tubing bundle 100, opposite to a power end 150 (FIG. 9) connected and positioned nearest to a power supply (not shown). Accordingly, a technician may access the connection system 124, as described below, without having to access the power end of the tubing bundle 100. The probe end 140 is generally a distal, or free end at which the length of the bundle may be trimmed, and thus, typically easier to access than the power end 150 when the tubing bundle 100 is installed.

Figure 7:
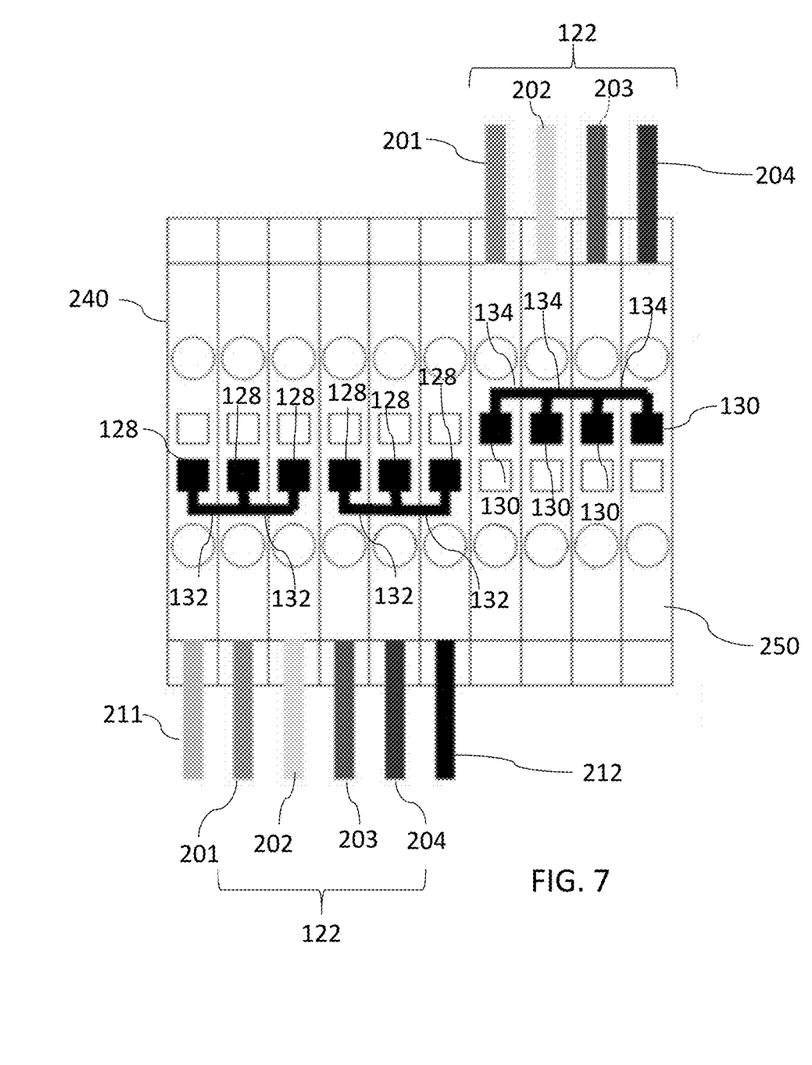
FIG. 7 is a diagram of a connection system of an electric heater according an embodiment.

FIG. 7 is a diagram of the connection system 124 according to an embodiment. In one embodiment, the connection system 124 further includes one or more power end bridges 132 selectively disposed between and electrically connecting input and power leads 128 to one another. In addition, the connection system 124 also includes one or more probe end bridges 134 selectively disposed between and electrically connecting output and return leads 130.

In one embodiment, the plurality of heater wires 122 may include four heater wires: a first heater wire 201, a second heater wire 202, a third heater wire 203 and a fourth heater wire 204. However, fewer or additional heater wires may be used as desired and installed in the tubing bundle 100 during manufacture. Each of the heater wires 201, 202, 203, 204 may be selected during manufacture to have a desired electrical resistance based on, for example, the physical characteristics of the wires. In one embodiment, each heater wire may include an output portion having the desired electrical resistance characteristics and connecting portions at opposite ends of the output portion configured for electrical connection, for example, to the leads 128, 130 of the connection system 124 or other electrical components.

The heater wires 201, 202, 203, 204 are connected to the connection system 124 at a probe side 240 and a power side 250 of the box 126. At the power side 250, the heater wires 201, 202, 203, 204 may be connected to respective input and power leads 128. At the probe side 240, the heater wires 201, 202, 203, 204 may be connected to respective output and return leads 130. In one embodiment, at least a portion of a length of the heater wires 201, 202, 203, 204 between the power side 250 and the probe side 240 extends along at least a portion of a length of the tubing bundle 100 or one or more tubes 110 of the bundle 100 to provide heat to the tube(s) 110 and fluid within the tube(s) 110. One or more power wires, such as first and second power wires 211, 212, may be connected at the power side 250 to respective input and power leads 128 as well.

The lead pairs 128, 130, and in some embodiments the power end bridges 132 and probe end bridges 134, may be moved into or out of various electrical connections to provide a plurality of heater circuit configurations for the heater 120. For example, a lead pair 128, 130 (or single lead of the pair) may be moved out of electrical connection from a particular heater wire to provide a different circuit configuration. Alternatively, or in addition, a power end bridge 132 and/or a probe end bridge 134 may be installed in the box 126 to electrically connect two leads 128 or 130 and provide another circuit configuration for the heater 120. Alternatively, or in addition, a lead pair 128, 130 (or single lead) may be electrically connected to a particular heater wire and/or a power end bridge 132 and/or probe end bridge 134 may be removed to provide different circuit configurations. Electrical connections may be formed between the leads 128, 130 and the heater wires in a known manner, for example, with electrically conductive screws, claims, switches, buttons, and the like.

Thus, each heater wire of the plurality of heater wires 122 may be selectively operated to output heat by electrically connecting corresponding pairs of leads 128, 130 to the heater wire or wires. Conversely, each heater wire may be selectively and independently operated to substantially not output heat by electrically disconnecting one or both of the lead pairs 128, 130 from the heater wire. Fewer or additional circuit configurations for the heater 120 may be provided by including fewer or additional heater wires 122, respectively, during manufacture.

In the manner described above, i.e., by operation of the lead pairs 128, and in some embodiments the power end bridges 130 and/or probe end bridges 132, different connections between the heater wires and power wires may be provided, resulting in different circuit configurations for the electric heater 120. The electrical resistance may vary depending on the circuit configuration. Accordingly, the output (and temperature) of the electric heater 120 may be varied as well. In one embodiment, each circuit configuration provides a different electrical resistance, and thus, different output or heating characteristics when a voltage is supplied to the circuit.

Figure 8:
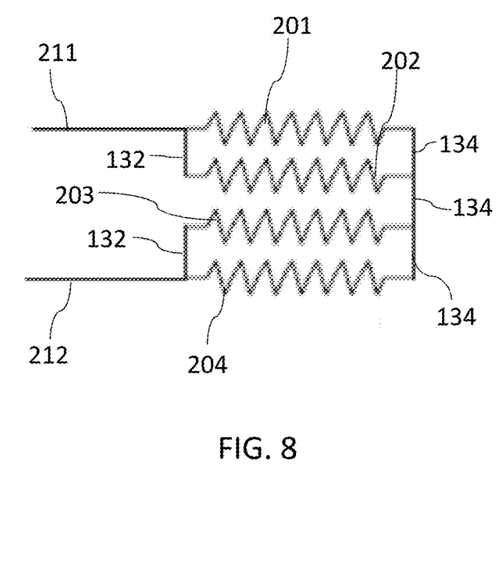
FIG. 8 is a schematic diagram showing a heater circuit configuration of the electric heater of FIG. 7.
Figure 9:
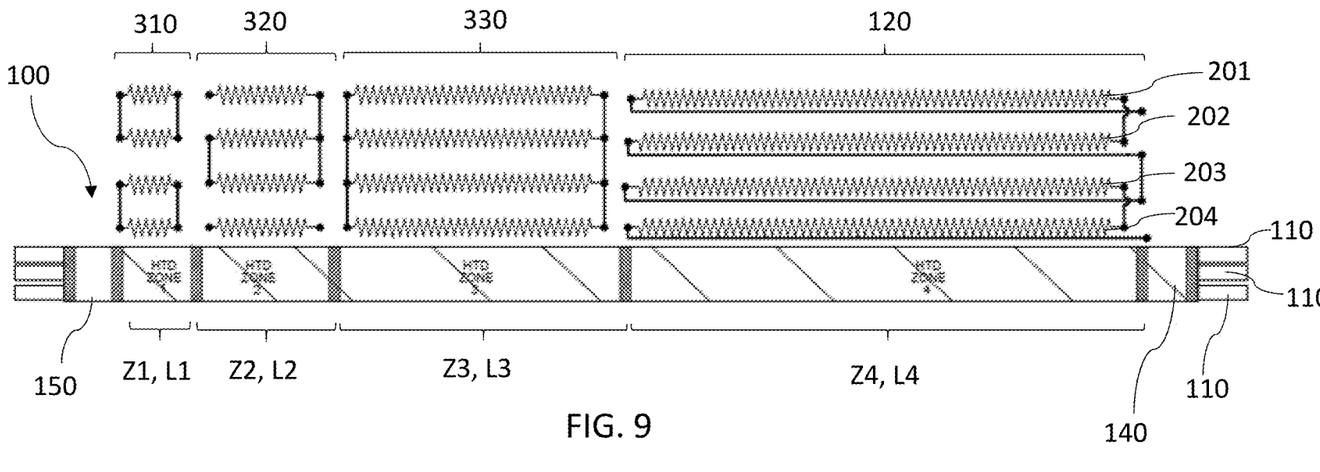
FIG. 9 is a schematic diagram of a tubing bundle having an electric heater according to an embodiment.

FIG. 9 is a schematic diagram of the electric heater 120 circuit based on the configuration of the heater wires 201, 202, 203, 204, power wire 211, 212, lead pairs 128, 130, power end bridges 132 and probe end bridges 134 shown at the connection system 124 of FIG. 8.

In the embodiments herein, a plurality of different circuit configurations for the heater 120 having different properties, such as resistance (and in turn, power or heat output) may be selected by a technician by way of electrically connecting selected input and power leads 128 and output and return leads 130 to a particular heater wire or wires 122 and in some embodiments, by installing or removing bridges 132, 134 at the connection system 124. The bridges 132, 134 may be installed or removed from an interior of the box 126, to which a technician has access.

The tubing bundle 100 according to the embodiments described herein, may be manufactured to have a first, initial length. A technician may trim or cut the tubing bundle 100 to a second length shorter than the first length, for example, before, during or after installing the tubing bundle system 100 in the field.

As described in the "Background" section, in conventional heated tubing bundles, cutting the tubing bundle to length typically results in increased power or heat output through the heating wires, which may result in operating parameters, such as temperature, being difficult to control.

In contrast, in the embodiments described herein, the technician may select an appropriate or suitable circuit configuration, i.e., a configuration in which the resistance in the heater wires 122 produces a suitable output to maintain a desired temperature or range, by selecting heater wires having predetermined electrical resistances during manufacture, electrically connecting or disconnecting the lead pairs 128, 130 from heater wires 122 or power wires 211, 212, and/or installing or removing power end bridges 132 and/or probe end bridges 134 to electrically connect or disconnect leads 128, 130 for different wires 120 in the field. Thus, in response to trimming or shortening of the tubing bundle 100 described herein, the technician may reconfigure the electric heater 120, by operation of the connection system 124, to adjust the power or heat output based on, for example, the trimmed, second length of the tubing bundle 100. Thus, in the embodiment described herein, the power or heat output, and in turn the temperature, may be more closely or accurately controlled, and a temperature of the fluid in the tube or tubes 110 may be maintained at a desired level or within a desired range.

In addition, reconfiguring of the heating wires 122, i.e., selecting a different circuit configuration, at the connection system 124 as described above may be conveniently performed by the technician at the probe end 140 of tubing bundle 100. Thus, the technician does not need to access the power end 150 of the tubing bundle 100. It is understood, however, that the present disclosure is not limited to this configuration, and that the connection system 124 may be disposed at the power end as required, or as convenient in other applications.

Moreover, in the embodiments described herein, the length of the tubing bundle 100 may be reduced by over 10% while still providing a desirable level control over power and heat output from the heater 120, and ultimately temperature, by way of electrically connecting, with a corresponding lead pair 128, 130, one or more desired heating wires of the plurality of heating wires 122 and in some embodiments positioning power and/or probe end bridges 132, 134 in a desired manner at the connection system 124 as described above. In some embodiments, the length of the tubing bundle 100 may be reduced by up to 50%, or more, while still providing sufficient control over power and heat output by way of the connection system 126 as described above.

Further, the tubing bundle 100 may be configured for use with different supply voltages. For example, the tubing bundle 100 according to an embodiment described herein may be used interchangeably with a supply voltage of 120 VAC and a supply voltage of 208-240 VAC, by reconfiguring the connection system 124 to select (i.e., electrically connect) a power wire 122 which provides a desired power or heat output for the supplied voltage.

Further still, in one embodiment, the tubing bundle 100 may be run as a bulk product then cut to a length desired by the customer. In another embodiment, the tubing bundle system may be run as a finished length then trimmed back after installation if the initial manufactured or purchased length is greater than the installed length. In another embodiment, the tubing bundle 100 may be operated at different supply voltages without changing the bundle. For example, the bundle may originally be ordered to operate at 120 VAC and changed to operate at 208 VAC without replacing the bundle 100 or the heater 120. This may be achieved, for example, by proper selection of the series resistance heater wires, selecting multiple alloys and sizes to achieve the proper or desired resistance, and operating the connection system to allow heater wires to be connected in a manner to create the proper or desired power or heat output for the length and voltage.

In the embodiments described herein, with a number of heater wires installed during manufacture, combined with a proper or sufficient selection of resistance heater wires, a series resistance heated bundle may be trimmed, for example, by 50% or more of its heated length while still allowing for sufficient control of power or heat output. The connection system allows a technician to trim back the series resistance heated bundle then reconfigure the heating wires by selecting electrical connections to create different heater circuit configurations, so the power or heat output is within a desired range for the application and type of controller.

In one embodiment, the connection system 124 may indicate which circuit configuration is suitable or optimal based on the operating voltage and the length of the bundle. In one embodiment, the selection of the circuit configuration is performed at the probe end of the bundle where the trim-back occurs. Thus, access to the power end is not required. In addition, in the embodiments described herein, the bundle may be configured to operate at different supply voltages, by reconfiguring the heater wires at the connection system. For example, a single bundle can operate at either 120 VAC or 208-240 VAC by changing the configuration. The heating wires may be reconfigured, for example, by routing the input and power leads to the heater as well as the termination or output leads to the connection system.

FIG. 9 is a schematic diagram of a tubing bundle 100 having the electric heater 120 according to an embodiment. In one embodiment, the tubing bundle 100 may have a plurality of heating zones along its length, and each heating zone may have a length. For example, as shown in FIG. 9, the tubing bundle 100 may include four heating zones Z1, Z2, Z3, Z4 having lengths L1, L2, L3, L4, respectively. It is understood that fewer and more heating zones may be included as during manufacture, as desired.

Figure 10:
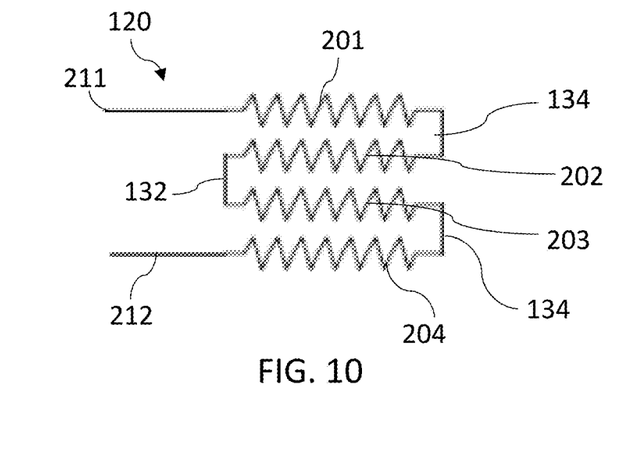
FIG. 10 is a schematic diagram showing a heater circuit configuration of the electric heater of FIG. 9.

In one embodiment, the heating zone Z1 is disposed nearest to the power end 150 of the tubing bundle 100 and heating zone Z4 is disposed nearest to the probe end 140 of the tubing bundle 100. In one embodiment the lengths L1, L2, L3 may be substantially fixed. However, the length L4 of heating zone Z4 may be adjustable. For example, heating zone Z4 may be trimmed to a desired length during installation. Thus, the heating zone Z4 may include the electric heater 120 described in the embodiments above, in which an electrical resistance, and in turn, a heat output, may be varied by using different configurations at the connection system 124. FIG. 10 is schematic diagram showing an example of the circuit configuration for the heater 120 of FIG. 9, selected by way of the connection system 124.

The heating zones Z1, Z2, Z3 having substantially fixed lengths L1, L2, L3, respectively, may also include electric heaters 310, 320, 330, each having a substantially fixed electrical resistance, and in turn, a substantially fixed output. In one embodiment, a configuration for the heaters 310, 320, 330 is determined during manufacture of the tubing bundle 100, for example, based on a length L1, L2, L3 of the zone Z1, Z2, Z3 in which the heater is installed, as well the desired or required temperature characteristics of the fluid to be transported within the tubes 110. Accordingly, the heaters 310, 320, 330 may be formed with any number of heater wires having desired electrical resistance characteristics, and the heater wires may be connected in a desired manner to provide a heater circuit with a suitable resistance, thereby providing the desired temperature output for the corresponding zone Z1, Z2, Z3.

Figure 11:
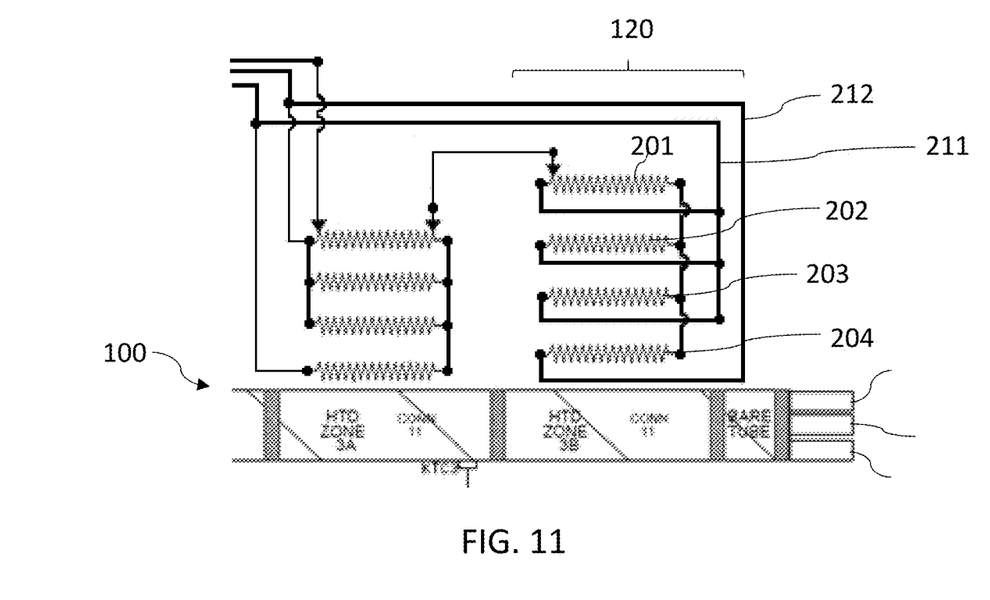
FIG. 11 is a schematic diagram showing a portion of a tubing bundle having an electric heater according an embodiment.
Figure 12:
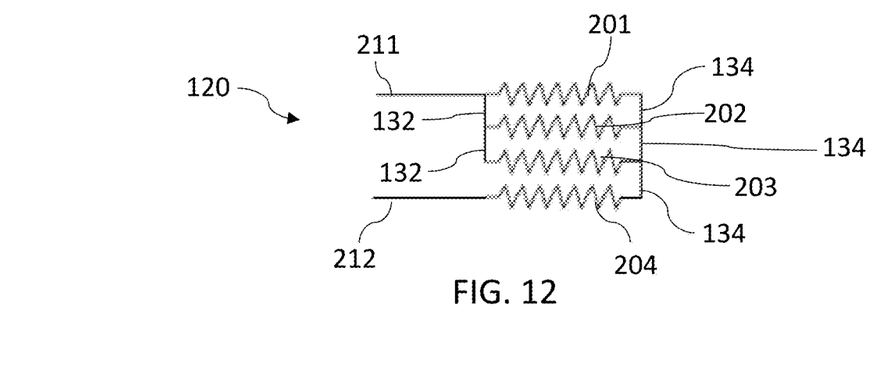
FIG. 12 is a schematic diagram showing a heater circuit configuration of the electric heater of FIG. 11.

FIG. 11 is a schematic diagram showing a portion of a tubing bundle 100 the electric heater 120 in another configuration. FIG. 12 is a schematic diagram of the circuit configuration for the heater 120 circuit of FIG. 11, selected at the connection system 124, based on, for example, length of the tubing bundle 100 or zone of the tubing bundle 100.

In the embodiments described above, numerous other circuit configurations for the electric heater 120 may be provided by forming or removing electrical connections at the connection system 124 by way of the lead pairs 128, 130 and/or the power end bridges 132 and/or the probe end bridges 134. Thus, the electric heater 120 may be configured to provide an output suitable for an installed length of the tubing bundle 100.

Thus, the system described herein may allow for proper or desired selection of resistance heater wires to meet design requirements of a particular application. The system described herein may allow for selection of multiple resistance heater wires which are configured to allow the bundle to be reconfigured to meet changes in bundle length. The connection system may be configured to allow reconfiguring the product as desired. The connection system may be configured to allow for reconfiguration with access to only the probe end of the product. The series resistance electrically heated bundle may be substantially shortened in the field while maintaining desired power or heat output control.

It is understood the various features from any of the embodiments above are usable together with the other embodiments described herein.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular. In addition, it is understood that terminology referring to orientation of various components, such as "upper" or "lower" is used for the purposes of example only, and does not limit the subject matter of the present disclosure to a particular orientation.

From the foregoing it will be observed that numerous modifications and variations can be effectuated without departing from the true spirit and scope of the novel concepts of the present disclosure. It is to be understood that no limitation with respect to the specific embodiments illustrated is intended or should be inferred. The disclosure is intended to cover all such modifications as fall within the scope of the claims.

What is claimed is:

1. An electrically heated tubing bundle, comprising:
   one or more tubes configured to allow a fluid to flow therethrough; and
   an electrical resistance heater comprising:
      a plurality of heater wires each having a predetermined electrical resistance, the heater wires extending along at least a portion of the one or more tubes;
      one or more power wires connected to a power supply; and
      a connection system having a plurality of input and power leads at a power side of the connection system and a plurality of output and return leads at a probe side of the connection system,
      wherein the one or more power wires are connected to respective power and input leads,
      wherein each heater wire is configured for selective electrical connection to an input and power lead and an output and return lead which form lead pairs for each heater wire, such that a plurality of different circuit configurations for the electrical resistance heater are provided based on electrical connections between the heater wires and the lead pairs, and
      wherein one or more heater wires of the plurality of heater wires has an electrical resistance different than an electrical resistance of another heater wire of the plurality of heater wires.

2. The electrically heated tubing bundle of claim 1, wherein each heater wire of the plurality of heater wires has a different electrical resistance.

3. The electrically heated tubing bundle of claim 1, wherein each heater wire of the plurality of heater wires has the same electrical resistance.

4. The electrically heated tubing bundle of claim 1, wherein a circuit configuration for the electrical resistance heater is selected at the connection system based on a length of the tubing bundle, a supply voltage, or desired temperature.

5. The electrically heated tubing bundle of claim 1, wherein the connection system is disposed at a probe end of the tubing bundle.

6. An electrically heated tubing bundle comprising:
one or more tubes configured to allow a fluid to flow therethrough; and
an electrical resistance heater comprising:
a plurality of heater wires each having a predetermined electrical resistance, the heater wires extending along at least a portion of the one or more tubes;
one or more power wires connected to a power supply; and
a connection system having a plurality of input and power leads at a power side of the connection system and a plurality of output and return leads at a probe side of the connection system,
wherein the one or more power wires are connected to respective power and input leads, and
wherein each heater wire is configured for selective electrical connection to an input and power lead and an output and return lead which form lead pairs for each heater wire, such that a plurality of different circuit configurations for the electrical resistance heater are provided based on electrical connections between the heater wires and the lead pairs,
further comprising one or more selectively removable power end bridges disposed between and electrically connecting two input and power leads, and one or more selectively removable probe end bridges disposed between and electrically connecting two output and return leads,
wherein the plurality of circuit configurations for the electrical resistance heater further include circuit configurations provided based on electrical connections formed by the power end bridges and the probe end bridges.

7. An electrically heated tubing bundle comprising:
one or more tubes configured to allow a fluid to flow therethrough; and
an electrical resistance heater comprising:
a plurality of heater wires each having a predetermined electrical resistance, the heater wires extending along at least a portion of the one or more tubes;
one or more power wires connected to a power supply; and
a connection system having a plurality of input and power leads at a power side of the connection system and a plurality of output and return leads at a probe side of the connection system,
wherein the one or more power wires are connected to respective power and input leads, and
wherein each heater wire is configured for selective electrical connection to an input and power lead and an output and return lead which form lead pairs for each heater wire, such that a plurality of different circuit configurations for the electrical resistance heater are provided based on electrical connections between the heater wires and the lead pairs,
wherein the circuit configurations of the plurality of circuit configurations have different electrical resistances.

8. An electrically heated tubing bundle comprising:
one or more tubes configured to allow a fluid to flow therethrough; and
an electrical resistance heater comprising:
a plurality of heater wires each having a predetermined electrical resistance, the heater wires extending along at least a portion of the one or more tubes;
one or more power wires connected to a power supply; and
a connection system having a plurality of input and power leads at a power side of the connection system and a plurality of output and return leads at a probe side of the connection system,
wherein the one or more power wires are connected to respective power and input leads, and
wherein each heater wire is configured for selective electrical connection to an input and power lead and an output and return lead which form lead pairs for each heater wire, such that a plurality of different circuit configurations for the electrical resistance heater are provided based on electrical connections between the heater wires and the lead pairs,
wherein a length of the tubing bundle includes a first length in an initial condition and a second length in a trimmed condition, wherein the second length is less than the first length.

9. The electrically heated tubing bundle of claim 8, wherein when the tubing bundle is in the initial condition, the electric resistance heater has a first circuit configuration, and when the tubing bundle is in the trimmed condition, the electric resistance heater has a second circuit configuration, different from the first circuit configuration.

* * * * *